(12) United States Patent
Clark

(10) Patent No.: US 9,085,060 B2
(45) Date of Patent: Jul. 21, 2015

(54) TURBINE SERVICING DEVICE

(71) Applicant: General Electric Company, Schenectady, NY (US)

(72) Inventor: Jason Matthew Clark, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 230 days.

(21) Appl. No.: 13/723,603

(22) Filed: Dec. 21, 2012

(65) Prior Publication Data

US 2014/0179200 A1 Jun. 26, 2014

(51) Int. Cl.
*B23P 6/00* (2006.01)
*B24B 19/14* (2006.01)
*B24B 23/02* (2006.01)
*B24B 23/08* (2006.01)
*F01D 25/28* (2006.01)

(52) U.S. Cl.
CPC .................. *B24B 19/14* (2013.01); *B23P 6/002* (2013.01); *B24B 23/026* (2013.01); *B24B 23/08* (2013.01); *F01D 25/285* (2013.01); *F05D 2230/72* (2013.01)

(58) Field of Classification Search
CPC .................................. B23P 6/002; B24B 19/14
USPC ........ 29/889.1, 402.01, 402.19, 402.11, 56.5, 29/281.6; 356/241.3; 451/6, 51, 61, 340, 451/356, 439, 494, 524, 525
See application file for complete search history.

(56) References Cited

U.S. PATENT DOCUMENTS

| | | | | |
|---|---|---|---|---|
| 2,547,057 | A | * | 4/1951 | Stieglitz ........................ 451/359 |
| 4,764,063 | A | * | 8/1988 | Rabe et al. ..................... 409/179 |
| 5,102,221 | A | * | 4/1992 | Desgranges et al. ............ 356/72 |
| 5,475,485 | A | * | 12/1995 | Diener ....................... 356/241.3 |
| 5,511,308 | A | * | 4/1996 | Ng et al. ...................... 29/889.1 |
| 5,644,394 | A | * | 7/1997 | Owens ....................... 356/241.5 |
| 5,803,680 | A | * | 9/1998 | Diener .......................... 409/130 |
| 7,032,279 | B2 | * | 4/2006 | McCarvill et al. ........... 29/90.01 |
| 8,713,775 | B2 | | 5/2014 | Zhang et al. |
| 8,726,502 | B2 | | 5/2014 | Clark et al. |
| 2012/0317771 | A1 | * | 12/2012 | Zhang et al. ............... 29/402.01 |
| 2013/0199008 | A1 | * | 8/2013 | Clark et al. .................. 29/23.51 |
| 2013/0232792 | A1 | * | 9/2013 | Quinones et al. ............ 29/889.1 |
| 2014/0223709 | A1 | * | 8/2014 | Clark et al. .................. 29/23.51 |

* cited by examiner

*Primary Examiner* — Timothy V Eley
(74) *Attorney, Agent, or Firm* — Cantor Colburn LLP

(57) ABSTRACT

A turbine servicing device includes a base member mountable proximate an inlet of a section of a turbine system. Also included is a retaining component operatively coupled to the base member. Further included is a rod having a first end and a second end, the rod in a slidable and pivotable relationship with the retaining component. Yet further included is a machining device operatively coupled to the rod proximate the second end and configured to polish a portion of a turbine component.

11 Claims, 5 Drawing Sheets

TURBINE SERVICING DEVICE

BACKGROUND OF THE INVENTION

The subject matter disclosed herein relates to turbine systems, and more particularly to a turbine servicing device, as well as a method of servicing a turbine system.

During operation of a section of a turbine system, components within that turbine system, such as rotor blades and stator vanes, typically are subjected to harsh operating conditions which may damage those components. In order to service components such as these, disassembly of at least a portion of the turbine system is required. Currently, in the case of servicing components within a compressor section, for example, a top half of a compressor case is removed to provide access to the components in need of service. Unfortunately, disassembly and subsequent reassembly is both costly and time consuming. Attempts to service these components without disassembly are typically limited by spatial constraints and repair device capabilities.

BRIEF DESCRIPTION OF THE INVENTION

According to one aspect of the invention, a turbine servicing device includes a base member mountable proximate an inlet of a section of a turbine system. Also included is a retaining component operatively coupled to the base member. Further included is a rod having a first end and a second end, the rod in a slidable and pivotable relationship with the retaining component. Yet further included is a machining device operatively coupled to the rod proximate the second end and configured to polish a portion of a turbine component.

According to another aspect of the invention, a method of servicing a turbine is provided. The method includes mounting a base member of a turbine servicing device proximate an inlet of a section of a turbine system. The method also includes extending a rod into the section of the turbine system, wherein the rod is controllably retained in a sliding a pivotable manner by a retaining component operatively coupled to the base member. The method further includes polishing a portion of a turbine component disposed within the section of the turbine system with a machining device operatively coupled to the rod.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
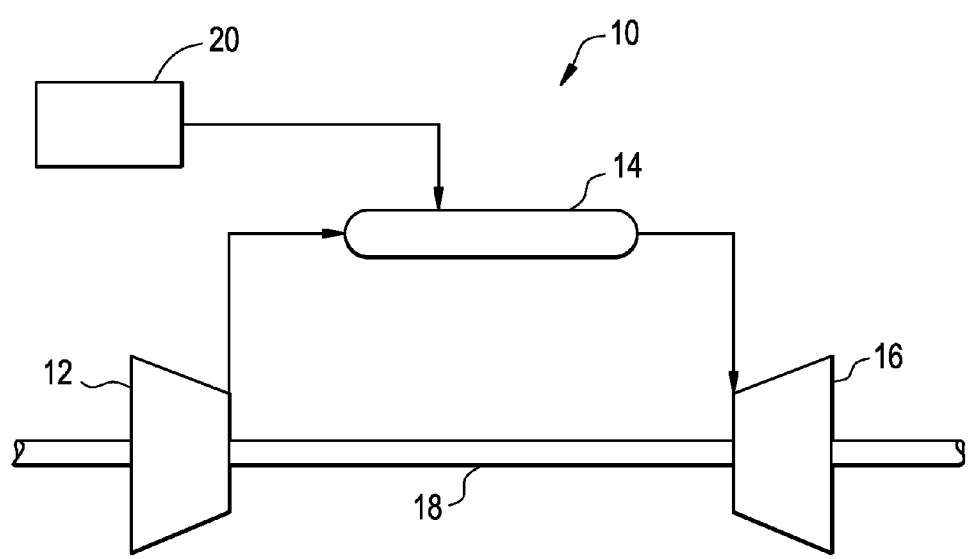
FIG. 1 is a schematic illustration of a turbine system.

Referring to FIG. 1, a turbine system is schematically illustrated and generally referred to with numeral 10. The turbine system 10, in the case of a gas turbine system, includes a compressor section 12, a combustor section 14, a turbine section 16, a shaft 18 and a fuel nozzle 20. It is to be appreciated that one embodiment of the gas turbine system 10 may include a plurality of compressor sections 12, combustor sections 14, turbine sections 16, shafts 18 and fuel nozzles 20. The compressor section 12 and the turbine section 16 are coupled by the shaft 18. The shaft 18 may be a single shaft or a plurality of shaft segments coupled together to form the shaft 18.

Figure 2:
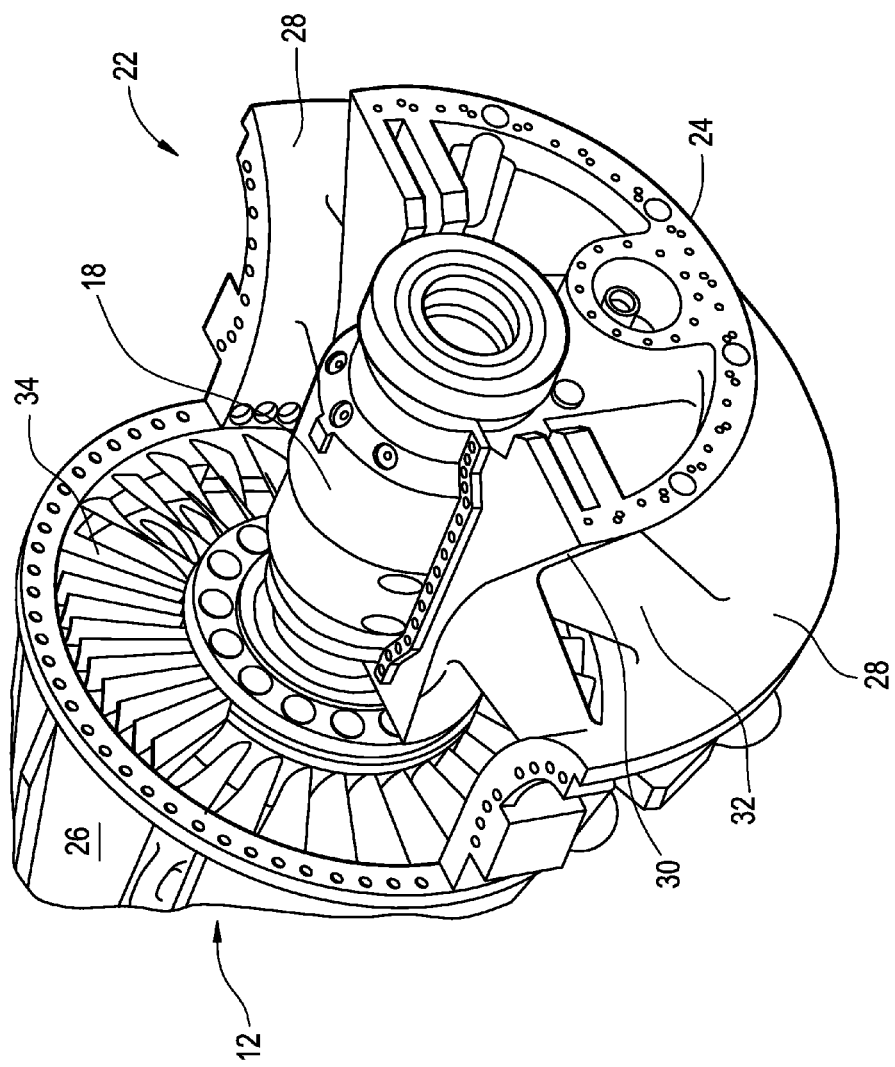
FIG. 2 is a partial perspective view of an inlet of a compressor section of the turbine system.

Referring now to FIG. 2, a partial, cut-away view illustrates an inlet 22 of the compressor section 12. Although illustrated and described herein as a compressor of a gas turbine system, it is to be understood that the embodiments described herein can be applied to steam turbine systems as well and to other sections of the turbine system 10. The inlet 22 generally refers to a region configured to route an incoming airflow to the compressor section 12 and comprises a compressor bell mouth 24. Half of the compressor bell mouth 24 has been removed to illustrate various vanes and blades disposed at an interior region of the compressor section 12, relative to a compressor section casing 26. The compressor bell mouth 24 includes an outer surface 28 and an inner surface 30, with the incoming airflow passing between these two surfaces. Typically, a plurality of support members 32 are operatively coupled to the outer surface 28 and the inner surface 30 for support.

Figure 3:
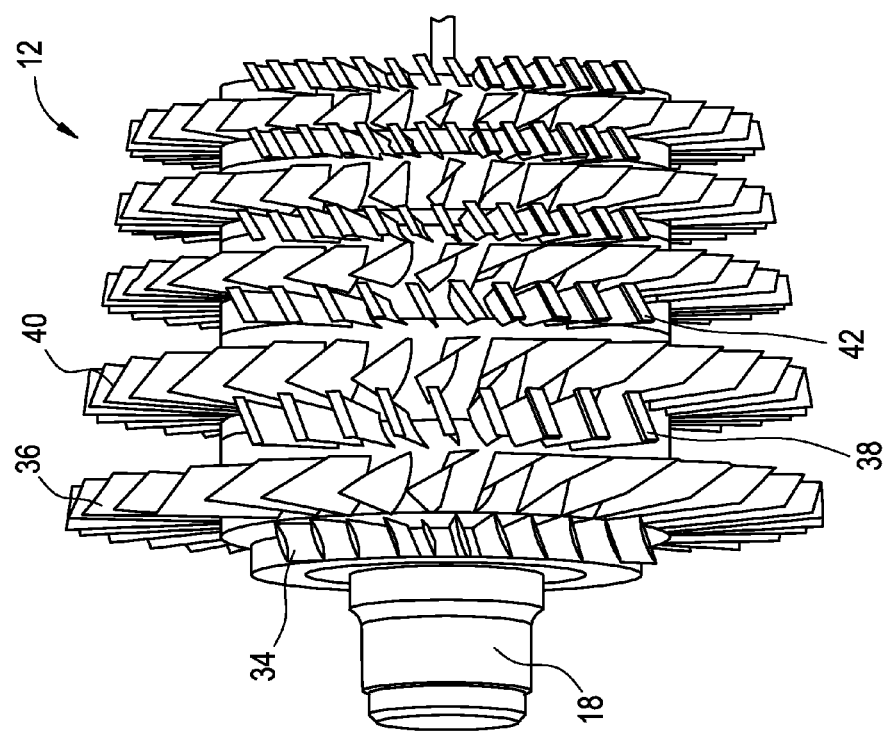
FIG. 3 is a side, elevational view of the compressor section.

Referring to FIG. 3, a plurality of inlet guide vanes (IGVs) 34 are arranged in a circumferentially spaced manner in what is referred to as a stage. Downstream of one or more stages of the plurality of IGVs 34 are a plurality of rotor blades and a plurality of stator vanes. The stator vanes are generally fixed to a stator or a compressor section casing 26, while the rotor blades are connected to the shaft 18. The plurality of IGVs 34 is generally fixed as well, but may pitch around a radial axis to vary the direction or amount of incoming flow. The plurality of IGVs 34 is followed by a first stage of rotor blades 36, which is in turn followed by a first stage of stator vanes 38. Disposed downstream of the first stage of stator vanes 38 is a second stage of rotor blades 40, which is followed by a second stage of stator vanes 42. It can be appreciated that the compressor section 12 may include varying numbers of stages of rotor blades and stator vanes, depending on the particular application.

Figure 4:
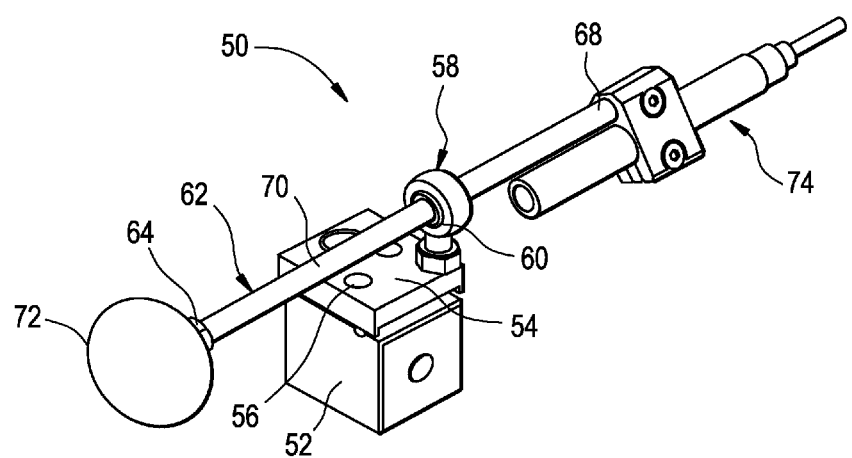
FIG. 4 is a perspective view of a turbine servicing device.
Figure 5:
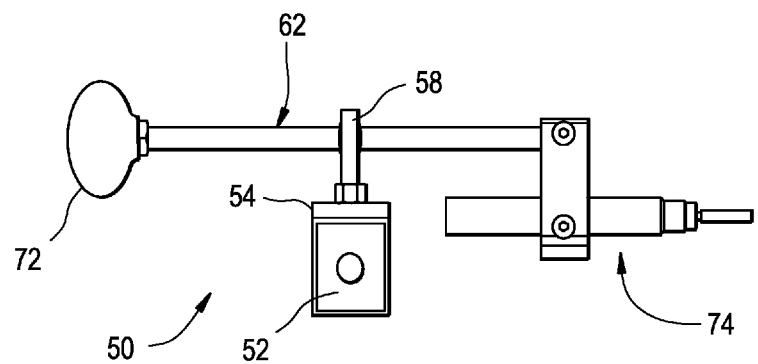
FIG. 5 is an elevational view of the turbine servicing device.

Referring now to FIGS. 4 and 5, in conjunction with FIGS. 2 and 3, a turbine servicing device 50 is illustrated. The turbine servicing device 50 includes a base member 52 removably mountable to the inlet 22 of the compressor section 12 directly or proximate to the inlet 22. The inlet 22, and more particularly the compressor bell mouth 24, is typically formed of a metallic material. In one embodiment, the base member 52 comprises a magnetic material for magnetically attaching the base member 52 to the metallic material of the inlet 22. It is contemplated that the turbine servicing device 50 comprises more than one base member configured to mount to the inlet 22.

Operatively coupled to, or integrally formed with, the base member 52 is a platform 54 comprising at least one, but typically a plurality of apertures 56 for receiving a mechanical fastener for operatively coupling a retaining component 58 to the base member 52. The plurality of apertures 56 provides positioning adjustability of the retaining component 58. The retaining component 58 includes an opening 60, typically in the form of a cylindrical opening for receiving a rod 62 therein. The rod 62 typically comprises a cylindrical geometry as well, however, it is contemplated that the opening 60 and the rod 62 comprise alternative geometries. Irrespective of the precise geometry of the opening 60 and the rod 62, it is to be appreciated that the geometries of the opening 60 and the rod 62 substantially correspond to each other, such that the rod 62 is slidable within the opening 60. In addition to a slidable relationship with the retaining component 58, the rod 62 is pivotable, with respect to the base member 52, as the retaining component 58 comprises a spherical bearing joint. The advantages of the slidable and pivotable nature of the rod 62 will be described in greater detail below.

The rod 62 includes a first end 64, a second end 68 and a body portion 70 therebetween. Operatively coupled proximate the first end 64 of the rod 62 is a handle 72 configured to allow a user, such as a human operator, to interact with the rod 62. In the case of a human operator, the user is able to grasp the handle 72 with a hand to control the rod 62. The handle 72 effectively forms a joint between a human operator's hand and the rod 62, which is of a rigid nature. The handle 72 may be shaped in numerous configurations and in the illustrated embodiment the handle 72 comprises a bulb-shaped member. Although described as being controlled by a human operator, it is contemplated that an alternative control mechanism may be employed to control the turbine servicing device 50, and more specifically the rod 62. Irrespective of the precise control mechanism or user, the retaining component 58 is configured to provide unrestricted freedom of motion of the second end 68 of the rod 62. Rather than merely allowing for a finite number of degrees of freedom of movement of the second end 68 of the rod 62, the spherical bearing joint allows the second end 68 to pivot in an unrestricted manner. Additionally, the rod 62 is free to slide within the opening 60 along the body portion 70 of the rod 62. It is to be appreciated that the sliding and pivoting movements may be performed simultaneously and in combination provide advantageous flexibility of movement of the second end 68.

Operatively coupled proximate the second end 68 of the rod 62 is a machining device 74 configured to polish a portion of a turbine component, such as one of the plurality of rotor blades or stator vanes described above. In an exemplary embodiment, the machining device 74 comprises an air grinder configured to remove rolled material that has accumulated as a result of normal operation of the turbine component. The machining device 74 typically includes one or more attachment features, such as flapper disks and abrasive polishing pads. The attachment features are interchangeable to provide machining flexibility based on the component requiring servicing and the precise polishing to be conducted. It is to be appreciated that the polishing of the turbine component may be performed in various manners, including in an oscillating or rotational manner, for example. As employed herein, the term "polish" refers to smoothing a workpiece's surface to provide a relatively flat, continuous and defect-free surface. As described above, the machining device 74 is configured to provide such a surface that lacks a rough, unfinished surface.

In addition to the grinding or polishing device itself, it is contemplated that the turbine servicing device 50 may include additional components integral to, or located proximate to, the machining device 74. Such components may include an optical device such as a borescope that may be remotely located to monitor the servicing process. The borescope may be fitted with an imaging or video device to identify regions in need of servicing. The imaging device may be a visual or infrared camera, a non-visual (e.g., X-ray, microwave, or eddy current) imaging device, or an ultrasonic imaging device. Additionally, multiple imaging devices may be deployed to provide a stereoscopic or 3D view of the desired area or to view various portions of the serviced region from various angles. A marking device is also contemplated to provide a user with markings that would enhance visual targets for the user. One or more light sources may also be included to aid in the inspection, marking and/or repair process. A distance measuring system can also be used to aid with the servicing process and with validation of servicing. Additionally, it is contemplated that a debris removal system, such as a vacuum, is included to facilitate removal of debris or particulate matter caused during the servicing process.

In operation, the base member 52 is secured proximate to the inlet 22 and at least a portion of the rod 62, and more specifically the machining device 74, is inserted into the compressor section 12 in a predominantly axial direction of the turbine system 10. The machining device 74 is inserted through at least one stage of the plurality of IGVs 34 to reach the turbine component to be serviced, such as a rotor blade or stator vane located in one of the stages of the compressor section 12. Navigating through the plurality of IGVs 34 and additional turbine components to reach and service the desired region is challenging based on tight spatial constraints, but the unrestricted degrees of freedom that the second end 68 of the rod 62 comprises allows a user to maneuver through such components and effectively service the component. It is contemplated that a user may insert an entire length of the rod 62, including the handle 72, into the compressor section 12.

Figure 6:
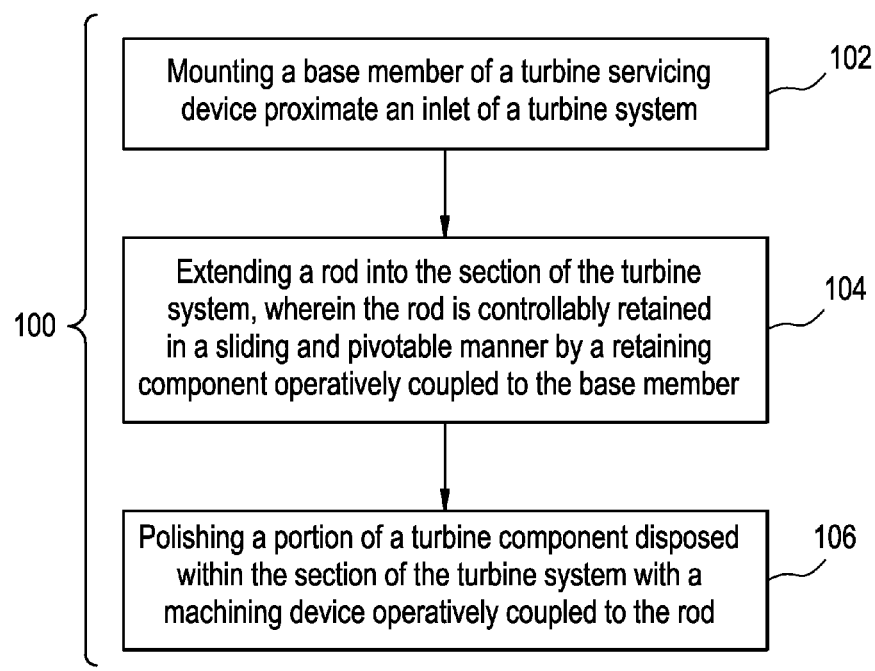
FIG. 6 is a flow diagram illustrating a method of servicing the turbine system.

Referring to the flow diagram of FIG. 6, in conjunction with FIGS. 1-5, a method of servicing a turbine 100 is provided. The turbine system 10 and more specifically the turbine servicing device 50 have been previously described and specific structural components need not be described in further detail. The method of servicing a turbine 100 includes mounting 102 a base member of the turbine servicing device proximate an inlet of a section of a turbine system. The method also includes extending 104 a rod into the section of the turbine system, where the rod is controllably retained in a sliding and pivotable manner by a retaining component operatively coupled to the base member. A portion of the turbine component is polished 106 with a machining device operatively coupled to the rod.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine servicing device comprising:
a base member mountable proximate an inlet of a compressor section of a turbine system;
a retaining component comprising a spherical bearing joint operatively coupled to the base member;
a rod having a first end and a second end, the rod in a slidable relationship with the retaining component and in a pivotable relationship with the base member;

a machining device operatively coupled to the rod proximate the second end and configured to polish a portion of a turbine component; and a user interface consisting of a single handle operatively coupled to the first end of the rod, wherein an entire length of the rod and the user interface is extendable into the compressor section through a plurality of inlet guide vanes.

2. The turbine servicing device of claim 1, wherein the base member comprises a magnetic material, the base member configured to magnetically attach to the inlet.

3. The turbine servicing device of claim 1, wherein the rod extends through a portion of the retaining component.

4. The turbine servicing device of claim 1, wherein the retaining component is mechanically fastened to the base member.

5. The turbine servicing device of claim 1, wherein the retaining component is adjustably mechanically fastened to the base member via at least one of a plurality of receiving apertures of the base member.

6. The turbine servicing device of claim 1, wherein the handle comprises a bulb-shaped handle.

7. The turbine servicing device of claim 1, wherein the handle is controllable by a human operator.

8. The turbine servicing device of claim 1, wherein the machining device comprises an air grinder.

9. The turbine servicing device of claim 8, wherein the air grinder is operatively coupled to at least one polishing pad.

10. The turbine servicing device of claim 1, wherein the turbine component comprises at least one of a rotor blade and a stator vane.

11. The turbine servicing device of claim 1, wherein the turbine servicing device further comprises at least one of an imaging device, a marking device, a light source, a distance measuring system, and a debris removal system.

\* \* \* \* \*